(12) United States Patent  
Dichtl

(10) Patent No.: US 7,710,652 B2
(45) Date of Patent: May 4, 2010

(54) GRID IMAGE WITH ONE OR SEVERAL GRID FIELDS

(75) Inventor: Marius Dichtl, Deutschland (DE)

(73) Assignee: Giesecke & Devrient, GmbH, Munich (DE)

( * ) Notice: Subject to any disclaimer, the term of this patent is extended or adjusted under 35 U.S.C. 154(b) by 347 days.

(21) Appl. No.: 10/587,294

(22) PCT Filed: Jan. 24, 2005

(86) PCT No.: PCT/EP2005/000659

§ 371 (c)(1),
(2), (4) Date: Jul. 24, 2006

(87) PCT Pub. No.: WO2005/071444

PCT Pub. Date: Aug. 4, 2005

(65) Prior Publication Data

US 2007/0109532 A1    May 17, 2007

(30) Foreign Application Priority Data

Jan. 26, 2004  (DE)  ........................ 10 2004 003 984

(51) Int. Cl.
*G02B 1/10* (2006.01)
(52) U.S. Cl. .................. 359/580; 359/566; 359/569
(58) Field of Classification Search ............. 359/566, 359/569, 573, 574, 580
See application file for complete search history.

(56) References Cited

U.S. PATENT DOCUMENTS

| 4,304,809 | A |   | 12/1981 | Moraw et al. |
| 5,101,184 | A | * | 3/1992 | Antes ........................ 235/454 |
| 5,338,915 | A |   | 8/1994 | Hildebrand et al. |
| 5,759,420 | A |   | 6/1998 | Minnetian et al. |
| 6,815,065 | B2 | * | 11/2004 | Argoitia et al. ............ 428/403 |
| 2001/0043396 | A1 | * | 11/2001 | Lee ........................... 359/569 |
| 2005/0185280 | A1 |   | 8/2005 | Kaule |
| 2006/0152807 | A1 |   | 7/2006 | Kaule |

FOREIGN PATENT DOCUMENTS

| DE | 31 30 182 | 2/1983 |
| DE | 102 26 115 | 12/2003 |
| DE | 102 43 413 | 12/2003 |
| EP | 0 012 375 | 6/1980 |
| EP | 0 536 625 | 4/1993 |

(Continued)

OTHER PUBLICATIONS

International Search Report for International Application No. PCT/EP2005/000659 mailed Feb. 17, 2006.

*Primary Examiner*—Joshua L Pritchett
(74) *Attorney, Agent, or Firm*—Knobbe Martens Olson & Bear, LLP

(57) ABSTRACT

The present invention relates to a grating image having one or more grating fields, each of which includes an electromagnetic radiation-influencing grating pattern comprising a plurality of grating lines, the grating lines being characterized by the parameters orientation, curvature, spacing and profile. According to the present invention, in the grating image, a grating field (30) that is separately perceptible with the naked eye includes an electromagnetic radiation-influencing grating pattern having grating lines (32) for which at least one of the characteristic parameters orientation, curvature, spacing and profile varies (34) across the surface of the grating field.

19 Claims, 5 Drawing Sheets

FOREIGN PATENT DOCUMENTS

| | | |
|---|---|---|
| EP | 0 467 601 | 2/1996 |
| EP | 0 758 587 | 2/1997 |
| EP | 0 766 103 | 4/1997 |
| EP | 0 712 500 | 10/2001 |
| GB | 2 136 352 | 9/1984 |
| GB | 2 205 529 | 12/1988 |
| WO | WO 94/14621 | 7/1994 |
| WO | WO 94/18609 | 8/1994 |
| WO | WO 97/16772 | 5/1997 |
| WO | WO 99/59036 | 11/1999 |
| WO | WO 03/106189 | 12/2003 |

* cited by examiner

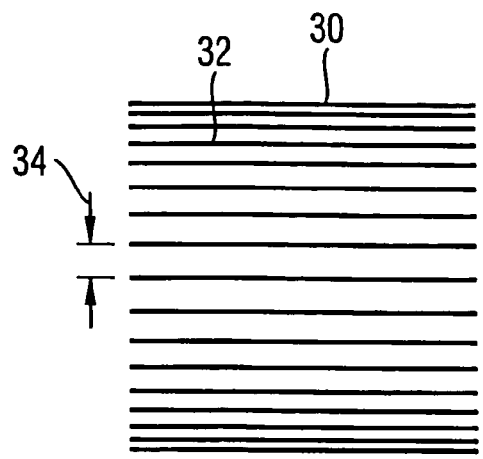
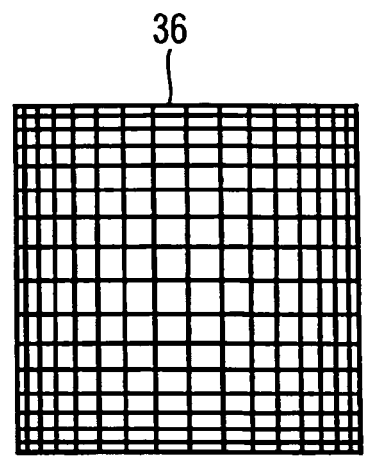
Fig. 3a                Fig. 3b
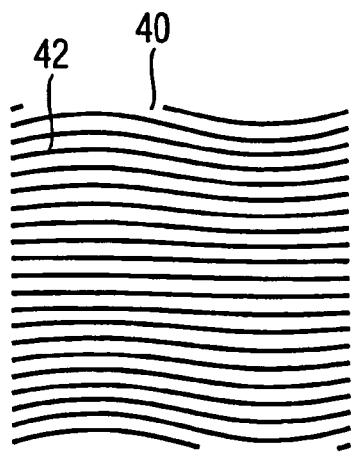
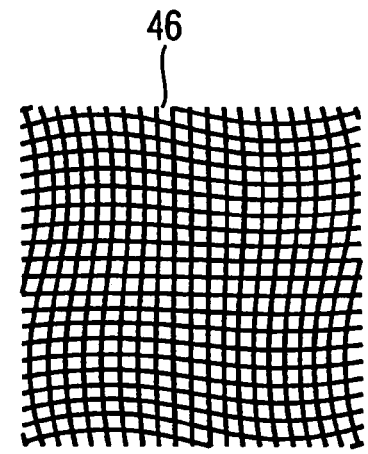
Fig. 4a                Fig. 4b
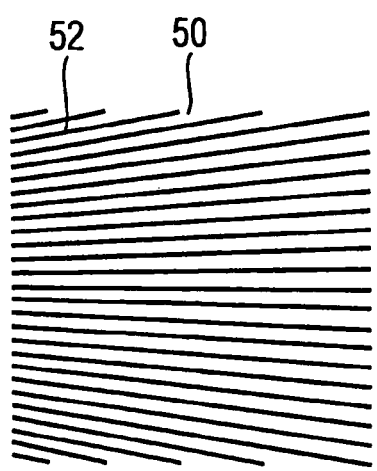
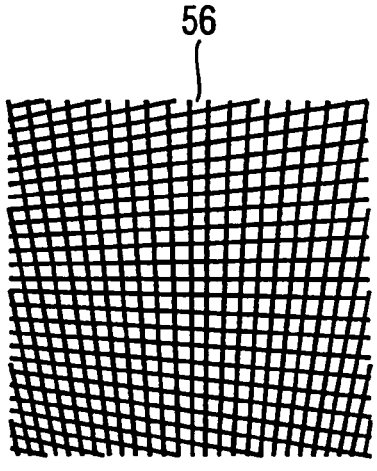
Fig. 5a                Fig. 5b

GRID IMAGE WITH ONE OR SEVERAL GRID FIELDS

BACKGROUND OF THE INVENTION

1. Field of the Invention

The present invention relates to a grating image having one or more grating fields, each of which includes an electromagnetic radiation-influencing grating pattern comprising a plurality of grating lines, the grating lines being characterized by the parameters orientation, curvature, spacing and profile. The present invention further relates to a method for manufacturing such a grating image, as well as a security element, a security paper and a data carrier having such a grating image.

2. Description of the Prior Art

To ensure the authenticity of credit cards, banknotes and other value documents, holograms, holographic grating images and other hologram-like diffraction patterns have been used for several years. In general, in the field of banknotes and security, holographic diffraction patterns are used that can be manufactured by embossing holographically produced grating images in thermoplastically moldable plastics or UV-curing lacquers on foil substrates.

True holograms are created by illuminating an object with coherent laser light and superimposing the laser light scattered by the object with an uninfluenced reference beam in a light-sensitive layer. So-called holographic diffraction gratings are obtained when the superimposed light beams in the light-sensitive layer consist of spatially extended, uniform, coherent wave fields. Through the action of the superimposed wave fields on the light-sensitive layer, for example a photographic film or a photoresist layer, a holographic diffraction grating is created there that can be preserved in the form of light and dark lines in a photographic film or in the form of peaks and valleys in a photoresist layer. Since, in this case, the light beams were not scattered by an object, the holographic diffraction grating produces merely an optically variable color impression, but no image representation.

From holographic diffraction gratings, it is possible to produce holographic grating images, not by covering the entire surface of the light-sensitive material with a uniform holographic diffraction grating, but rather by using suitable masks to cover, in each case, only portions of the recording surface with one of multiple different uniform grating patterns. Such a holographic grating image is thus composed of multiple grating fields having different diffraction grating patterns that normally lie next to one another in a planar, strip-shaped or pixel-like design. With such a holographic grating image, it is possible to depict numerous different image motifs through suitable arrangement of the grating fields. The diffraction grating patterns can be produced not only through direct or indirect optical superimposition of coherent laser beams, but also by means of electron lithography. Frequently, a sample diffraction pattern is produced that is subsequently translated into a relief pattern. This relief pattern can be used as an embossing die.

From publication DE 102 26 115 A1 are known grating images that are not composed of individual pixels or strips, but rather in which large grating fields that are perceptible with the naked eye are covered with a uniform grating pattern. In this way, since unexposed empty spaces are avoided and only a few discontinuous transitions are present between the large-area grating fields, a high light intensity of the grating images is achieved.

Based on that, it is the object of the present invention to further improve grating images of the kind cited above, and especially to create grating images having new optical effects and/or to further increase the counterfeit security of the grating images while preserving the existing advantages.

SUMMARY OF THE INVENTION

This object is solved by the grating image having the features of the main claim. A further grating image and a manufacturing method, as well as a security element, a security paper and a data carrier having such grating images are specified in the coordinated claims. Developments of the present invention are the subject of the dependent claims.

The present invention builds on the background art in that, in the grating image, a grating field that is separately perceptible with the naked eye includes an electromagnetic radiation-influencing grating pattern having grating lines for which at least one of the characteristic parameters orientation, curvature, spacing and profile varies across the surface of the grating field. Said grating field preferably includes an electromagnetic radiation-influencing grating pattern comprising uninterrupted grating lines.

In the context of the present description, diffraction is understood to be the deviation from the rectilinear propagation of light that is not caused by refraction, reflection or scattering, but rather that occurs when light impinges on obstructions such as slits, diaphragms, edges or the like. Diffraction is a typical wave phenomenon and is thus strongly wavelength-dependent and always associated with interference. It is to be distinguished especially from the processes of reflection and refraction, which can be accurately described with the image of geometric light beams. When dealing with diffraction by many, statistically distributed objects, it has become common to speak of scattering rather than of diffraction by irregularly distributed objects.

Scattering is understood to be the deflection of a portion of a focused electromagnetic wave from its original direction when passing through matter due to the interaction with one or more scattering centers. The radiation diffusely scattered in all directions, or the entirety of the scattering waves emanating from the scattering centers, disappears from the primary radiation. Scattering of light by objects whose size is in the range of the light wavelength and below is normally likewise wavelength-dependent, such as Rayleigh scattering or Mie scattering. Above an object size exceeding ten times the wavelength, scattering is commonly referred to as non-selective scattering, in which all wavelengths are influenced approximately equally.

Non-selective scattering can, however, also be achieved with smaller objects if the objects exhibit only an irregular distribution and a suitable spectrum of object sizes, as then the wavelength-dependent properties of the individual objects average out across the entire ensemble.

Since the characteristic parameters of the grating pattern according to the present invention, as described in detail below, can exhibit both a regular, continuous, and a random, discontinuous variation, it is possible to produce both effects that are commonly described with diffraction processes and effects that are commonly described with scattering processes. In the context of this description, such grating patterns are thus generally referred to as electromagnetic radiation-influencing grating patterns.

In a first advantageous variant of the present invention, the varying characteristic parameter(s) exhibit a continuous variation across the surface of the grating field. Here, continuous variation means especially that the numerical value of the appropriate parameter increases or decreases in each case in several to many steps. For example, the spacing of the i-th and (i+1)-th grating line of an electromagnetic radiation-influencing grating pattern can be given by the relation $$dcont(i,i+1)=(dmax+dmin)/2+(dmax-dmin)/2*\sin(i*2\pi/N)$$

where dmin represents the minimum grating line spacing, for example dmin=0.2 μm, dmax the maximum grating line spacing, for example dmax=2.0 μm, and N the repetition period, for example N=20. The spacing of the grating lines then cycles slowly and continuously between the extreme values dmin and dmax. For the present invention, however, it is not essential that the parameter values be able to be described by a formulaic relationship. It is possible to indicate a continuous variation in the other characteristic parameters orientation, curvature and profile in a similar manner.

According to a further, likewise advantageous variant of the present invention, the varying characteristic parameter(s) exhibit a random, especially a random and discontinuous variation across the surface of the grating field. For example, the spacing of the i-th and (i+1)-th grating line of an electromagnetic radiation-influencing grating pattern can be given by the relation $$drand(i,i+1)=dmin+(dmax-dmin)*Rand(\ )$$

where dmin and dmax again represent the minimum and maximum grating line spacing and Rand( ) represents a random number or suitable generated pseudo-random number from the interval [0,1]. The spacing of the grating lines then jumps arbitrarily between random values from the interval [dmin, dmax] from grating line to grating line.

The range of the grating line spacing preferably lies between about one-tenth and about ten times the wavelength for which the grating image is designed. In grating images intended for viewing in white light, λ=550 nm can be used as the design wavelength. Grating line spacings that lie between about half and about twice the design wavelength are particularly preferred.

In one development of the present invention, said grating field includes a further electromagnetic radiation-influencing grating pattern having grating lines for which at least one of the characteristic parameters orientation, curvature, spacing and profile varies across the surface of the grating field. The two electromagnetic radiation-influencing grating patterns preferably exhibit a variation in the same parameters. The grating lines of the two electromagnetic radiation-influencing grating patterns expediently differ from one another by an unvarying characteristic parameter, especially by the orientation of the grating lines.

For example, in the two electromagnetic radiation-influencing grating patterns, the spacing or curvature can be continuously or randomly varied in each case, and the orientation of the second electromagnetic radiation-influencing grating pattern rotated by a certain angle, about 90°, against the orientation of the first electromagnetic radiation-influencing grating pattern. It is understood that the grating field can also include more than two superimposed electromagnetic radiation-influencing grating patterns.

In an advantageous embodiment, said grating field forms a matte pattern that displays no diffractive effects when viewed. In this way, surface areas having a matte appearance can easily be integrated into an electron beam lithographically produced grating image. In an expedient embodiment, the characteristic parameters of the grating lines are varied in such a way that the matte pattern displays no coloring at all. The grating image surface area that is covered with the matte pattern then appears, for example, as a metallic, matte area. In a development of this embodiment, the grating images having a matte pattern exhibit a different optical brightness. In a preferred variant, through the different brightnesses, it is possible to produce matte-pattern halftone images that are suitable especially for depicting portraits. Furthermore, through precise setting of the brightness of individual or multiple matte pattern areas, a machine-readable, optically imperceptible identifier can be produced in the grating image.

A further aspect of the invention relates to a grating image having multiple grating fields, each of which includes an electromagnetic radiation-influencing grating pattern comprising a plurality of grating lines, the grating lines being characterized by the parameters orientation, curvature, spacing and profile, and a first grating field including grating lines having first characteristic parameters, and a second, adjoining grating field including grating lines having second characteristic parameters. According to the present invention, between the first and second grating field is provided a transition area in which the characteristic parameters of the grating lines of the first grating field continuously change into the characteristic parameters of the grating lines of the second grating field. Here, the grating lines of the first grating field preferably change in the transition area without interruption into grating lines of the second grating field.

In an expedient embodiment, the transition area exhibits a size below the resolution limit of the naked eye. At the boundary between the grating fields, interfering optical artifacts are then avoided without the viewer being able to perceive the transition area itself with the naked eye. Alternatively, the transition area exhibits a size above the resolution limit of the naked eye, so that it can be perceived by a viewer. This can be exploited to produce novel optical effects in the transition of two grating fields.

In this context, the first and/or second grating field can constitute a grating field of the kind described above that is separately perceptible with the naked eye. One of the two grating fields can especially form a matte pattern that displays no diffractive effects when viewed. In this way, for example, smooth transitions can be realized between sinus gratings and matte pattern areas within an electron beam lithographically produced grating image.

In all described grating images, the grating lines are advantageously electron beam lithographically produced. This technique facilitates the production of grating images in which each individual grating line can be unambiguously defined by the parameters orientation, curvature, spacing and profile.

It has proven to be expedient when the grating lines exhibit a line profile depth between about 100 nm and about 400 nm. The grating image itself is preferably coated with a reflecting or high-index material. All metals and many metal alloys may be used as reflecting materials. Examples of suitable high-index materials are CaS, $CrO_2$, ZnS, $TiO_2$ and $SiO_x$. Advantageously, there is a significant difference in the refractive index of the medium into which the grating image is introduced and that of the high-index material, preferably the difference is even greater than 0.5. The grating image can be produced in an embedded or non-embedded embodiment. For embedding, PVC, PET, polyester or a UV paint layer, for example, are suitable.

The grating image embodiment according to the present invention also facilitates, in addition to novel optical effects, an unambiguously machine-readable, but optically invisible marking of hologram-like grating images. For example, the grating images can be provided with a digital water mark. In this way, the counterfeit security of such grating images can be significantly increased.

The present invention also comprises methods for manufacturing grating images, as well as a security element having a grating image of the kind described above. The security element can especially be a security thread, a label or a transfer element. The present invention further comprises a security paper having such a security element, as well as a data carrier that is furnished with a grating image, a security element or a security paper of the kind described. The data carrier can especially be a banknote, a value document, a passport, an identification card or a certificate.

In a further embodiment, the grating image according to the present invention, preferably a matte pattern, can be combined with a color shifting thin-layer structure. Here, the total surface of the grating image or just a sub-surface of the grating image can be provided with the thin-film structure. Depending on the application, the thin-film structure can be designed to be opaque or semitransparent and comprises at least three layers. For example, the layer structure can comprise a reflection layer, an absorber layer and a dielectric layer lying between these two layers. The reflection layer is usually a metal layer, e.g. comprising aluminum. Alternatively, the thin-film structure consists of two absorber layers and a dielectric layer lying between the absorber layers. It is also conceivable that multiple absorber and dielectric layers are present in alternation, or that exclusively dielectric layers are provided, adjoining layers having strongly different refractive indices so that a color shift effect is produced.

Metal layers comprising materials such as chrome, iron, gold, aluminum or titanium typically serve as absorber layers, in a thickness of preferably 4 nm to 20 nm. Also compounds such as nickel-chrome-iron or rarer metals such as vanadium, palladium or molybdenum can be used as absorber layer materials. Further suitable materials include e.g. nickel, cobalt, tungsten, niobium, aluminum, metal compounds such as metal fluorides, oxides, sulfides, nitrides, carbides, phosphides, selenides, silicides and compounds thereof, as well as carbon, germanium, cermet, iron oxide and the like. The absorber layers can be identical, but they can also have different thicknesses and/or comprise different materials.

Mainly transparent materials with a low refractive index<1.7 may be used for the dielectric layer, such as $SiO_2$, MgF, SiOx with $1<x<2$ and $Al_2O_3$. In principle, almost all vapor-depositable, transparent compounds may be used, thus especially also higher-index coating materials, such as $ZrO_2$, ZnS, $TiO_2$ and indium tin oxide (ITO). The layer thickness of the dielectric layer D lies in the range of 100 nm to 1,000 nm, preferably 200 nm to 500 nm.

A wide variety of evaporation methods are suitable for producing the layers. Physical vapor deposition (PVD) with boat evaporation, evaporation by resistance heating, evaporation by induction heating, or electron beam evaporation, sputtering (DC or AC) and arc evaporation form a methodological group. On the other hand, the evaporation can also take place as chemical vapor deposition (CVD), such as sputtering in reactive plasma or any other plasma-based type of evaporation. There also exists, in principle, the possibility of imprinting dielectric layers.

The combination of matte patterns and color-shifting thin-layer structures is very difficult to counterfeit, since the technologies for manufacturing these elements are extremely difficult to procure. Furthermore, the design of the matte pattern and of the thin-film structure can be precisely coordinated with each other such that completely novel optical effects can be achieved.

BRIEF DESCRIPTION OF THE DRAWINGS

Further embodiments and advantages of the present invention are described below with reference to the drawings. To improve clarity, a depiction to scale and proportion was dispensed with in the drawings.

Shown are.

DETAILED DESCRIPTION OF THE PREFERRED EMBODIMEN

Figure 1:
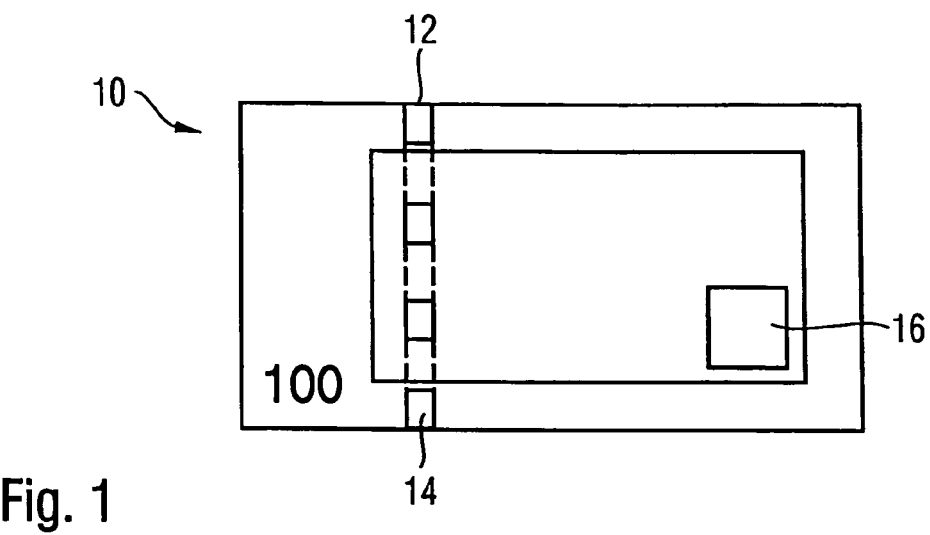
FIG. 1 a schematic diagram of a banknote having an embedded security thread and affixed transfer element, each according to an exemplary embodiment of the present invention, FIG. 2 in (a), a grating image having three grating fields, diagrammed schematically, the covering of the grating fields with different electromagnetic radiation-influencing grating patterns being indicated in (b), FIG. 3 in each of (a) and (b), a detailed top view of a grating field according to the present invention, having an electromagnetic radiation-influencing grating pattern for whose grating lines the parameter spacing varies continuously across the surface of the grating field, FIG. 4 in each of (a) and (b), a detailed top view of a grating field according to the present invention, having an electromagnetic radiation-influencing grating pattern for whose grating lines the parameter curvature varies continuously across the surface of the grating field, FIG. 5 in each of (a) and (b), a detailed top view of a grating field according to the present invention, having an electromagnetic radiation-influencing grating pattern for whose grating lines the parameter orientation varies continuously across the surface of the grating field, FIG. 6 to 8 in each case, detailed top views of grating fields according to the present invention, having electromagnetic radiation-influencing grating patterns for whose grating lines one of the characteristic parameters varies randomly and discontinuously, FIG. 9 two detailed top views of the transition between two adjoining grating fields, in (a) a conventional discontinuous transition and in (b) a continuous transition according to an exemplary embodiment of the present invention being shown, FIG. 10 a top view of a security element having a thin-film structure, and FIG. 11 a cross section through a security element having a thin-film structure.

FIG. 1 shows a schematic diagram of a banknote 10 that exhibits two security elements according to the present invention, namely a security thread 12 and an affixed transfer element 16. The security thread 12 is formed as a window security thread that emerges at certain window areas 14 on the surface of the banknote 10, while it is embedded in the interior of the banknote 10 in the areas lying therebetween. Both security elements 12, 16 are furnished with grating images of the kind described below.

Figure 2A:
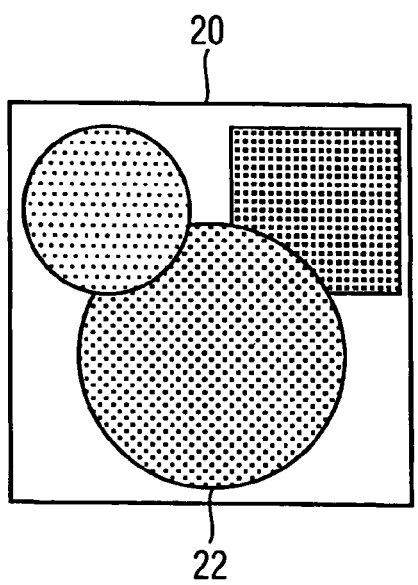
Figure 2B:
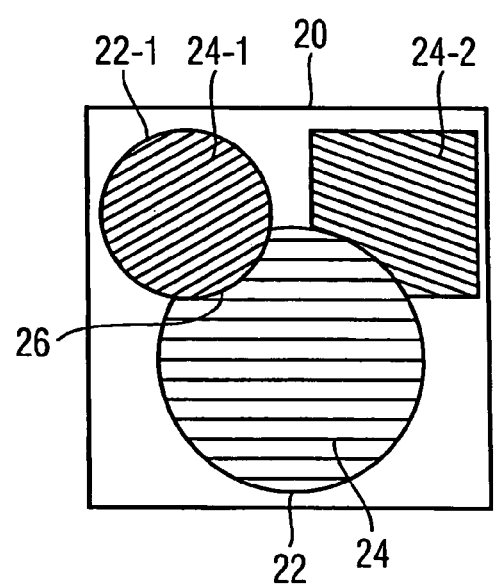

The general conformation of a hologram-like grating image is depicted in FIG. 2. With reference to FIG. 2(a), a hologram-like grating image 20 includes multiple grating fields 22 having different electromagnetic radiation-influencing grating patterns. The electromagnetic radiation-influencing grating patterns are usually line gratings 24 having a plurality of identical parallel grating lines lying next to each other, as shown schematically in FIG. 2(b). Here, the dimensions and spacing of the grating lines are drawn strongly exaggerated for illustration purposes. The grating constant of the grating pattern of grating images according to the present invention is actually typically in the range of about 0.4 μm to about 2 μm, so that an appropriately large number of grating lines is required to produce grating fields having dimensions of a few millimeters or a few centimeters.

The grating lines 24 of every electromagnetic radiation-influencing grating pattern can be described by four characteristic parameters, namely by their orientation, curvature, spacing and the profile of the individual lines. At the borderline 26 between two adjoining grating fields, a discontinuity usually results in relation to at least one of the cited parameters. For example, the grating lines 24 and 24-1 of grating fields 22 and 22-1 are both formed to be straight and having a sinusoidal profile (not visible in FIG. 2(b)), so do not differ in the parameters curvature and profile. In contrast, they differ significantly both in their orientation and in their spacing.

FIGS. 3 to 8 show schematically highly magnified sections of a grating field to be able to explain the arrangement of the individual grating lines to each other. According to the present invention, the entire grating field is covered with such uninterrupted grating lines.

FIG. 3(a) shows a detailed top view of a grating field 30 according to an exemplary embodiment of the present invention, having an electromagnetic radiation-influencing grating pattern for whose grating lines 32 the parameter spacing varies continuously across the surface of the grating field 30. Here, the entire grating field 30 is formed to be so large that it is separately perceptible with the naked eye.

As is clearly visible in FIG. 3(a), the spacing 34 of the individual grating lines initially increases continuously from the image bottom to the top and thereafter continuously decreases again. It is understood that the horizontal orientation of the grating lines 32 shown does not represent any limitation and that any preferred directions of the grating lines 32 are possible.

In FIG. 3(b), a detailed top view of a grating field 36 is shown whose grating line pattern consists of two electromagnetic radiation-influencing grating patterns of the type shown in FIG. 3(a), rotated 90° against each other. This can be achieved, for example, by consecutively exposing two gratings according to FIG. 3(a).

As a further exemplary embodiment of the present invention, FIG. 4(a) shows a detailed top view of a grating field 40 having an electromagnetic radiation-influencing grating pattern for whose grating lines 42 the parameter curvature varies continuously across the surface of the grating field 40. Starting from the bottom edge of the section shown, the curvature of the individual grating lines initially decreases continuously until a straight grating line without curvature is achieved in the center of the image. Then the curvature increases continuously up to the top edge of the image.

Also the grating field 40, like the grating fields 50, 60, 70 and 80 shown in the following FIGS. 5 to 8, is formed to be so large that it is separately perceptible with the naked eye. Likewise, each preferred orientation shown for the grating lines is not intended to represent a limitation, but rather should make it clear that any preferred orientations of the grating lines are possible.

FIG. 4(b) shows a detailed top view of a grating field 46 whose grating line structure consists of two electromagnetic radiation-influencing grating patterns of the type shown in FIG. 4(a), rotated 90° against each other, which can be achieved, for example, by consecutively exposing two gratings according to FIG. 4(a).

In the exemplary embodiment in FIG. 5(a), the grating field 50 exhibits an electromagnetic radiation-influencing grating pattern for whose grating lines 52 the parameter orientation varies continuously across the surface of the grating field 50. Starting from the bottom edge of the section shown, the orientation of the individual grating lines rotates continuously counterclockwise. Outside the area shown, this rotation can continue and/or be supplemented by a clockwise rotation.

The detailed top view in FIG. 5(b) shows a grating field 56 whose grating line pattern consists of two electromagnetic radiation-influencing grating patterns of the type shown in FIG. 5(a), rotated 90° against each other, which in turn can be achieved, for example, by consecutively exposing two gratings according to FIG. 5(a).

Figure 6A:
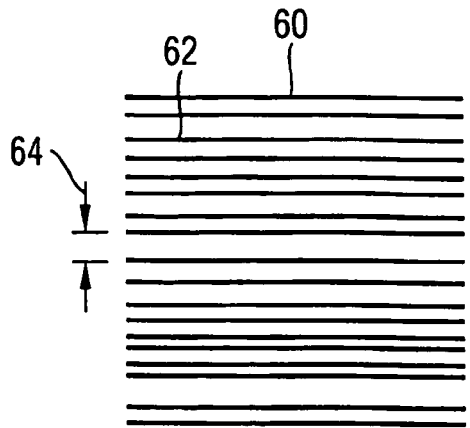

FIG. 6(a) shows a further exemplary embodiment in which the grating field 60 exhibits an electromagnetic radiation-influencing grating pattern for whose grating lines 62, as in FIG. 3(a), the parameter spacing varies across the surface of the grating field 60. However, contrary to the exemplary embodiment in FIG. 3(a), the spacing 64 of the individual grating lines does not vary continuously, but rather randomly and discontinuously, as is clearly visible in FIG. 6(a). The random variation continues outside the section shown, across the entire surface of the grating field 60.

Figure 6B:
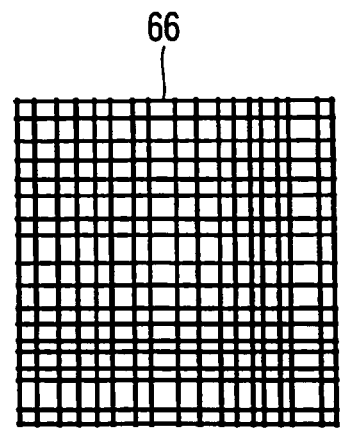

FIG. 6(b) shows a detailed top view of a grating field 66 whose grating line pattern consists of two electromagnetic radiation-influencing grating patterns of the type shown in FIG. 6(a), rotated 90° against each other, which can be achieved by consecutively exposing two gratings according to FIG. 6(a).

Figure 7A:
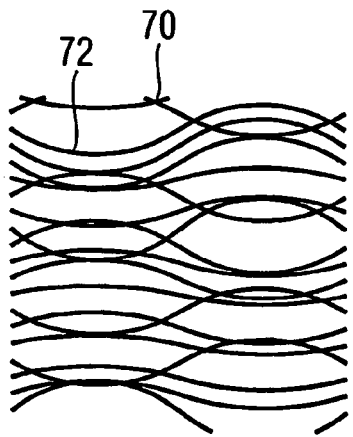

In the exemplary embodiment in FIG. 7(a), the grating field 70 exhibits an electromagnetic radiation-influencing grating pattern for whose grating lines 72, as in FIG. 4(a), the parameter curvature varies across the surface of the grating field 70. However, contrary to the exemplary embodiment in FIG. 4(a), the curvature of the individual grating lines does not vary continuously, but rather randomly and discontinuously, as is clearly visible from FIG. 7(a). The random variation continues outside the section shown, across the entire surface of the grating field 70.

Figure 7B:
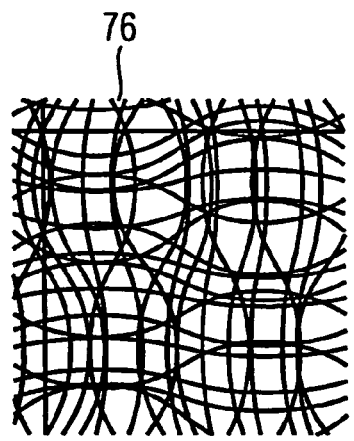

The detailed top view in FIG. 7(b) shows a grating field 76 whose grating line pattern consists of two electromagnetic radiation-influencing grating patterns of the type shown in FIG. 7(a), rotated 90° against each other, which can be achieved, for instance, by consecutively exposing two gratings according to FIG. 7(a).

Figure 8A:
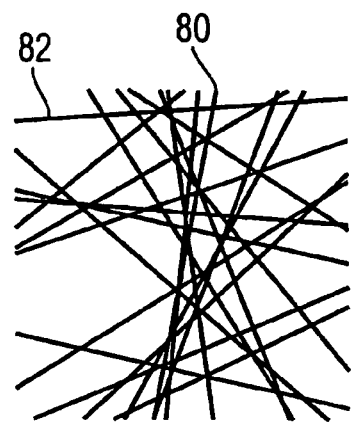
Figure 8B:
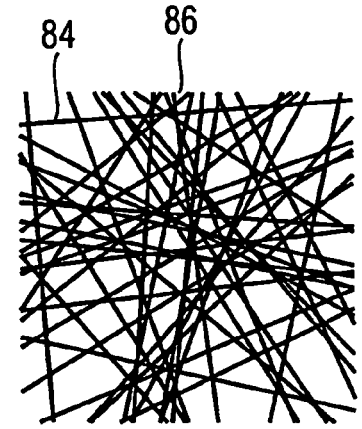

As a further exemplary embodiment, FIG. 8(a) shows a grating field 80 having an electromagnetic radiation-influencing grating pattern whose grating lines 82 are rotated completely randomly toward each other, so that the parameter orientation varies randomly and discontinuously across the surface of the grating field 80. The random variation continues outside the section shown, across the entire surface of the grating field 80. Such an electromagnetic radiation-influencing grating pattern produces a matte pattern that is perceptible in, for example, a directionally diffracting environment. FIG. 8(b) likewise shows a grating field 86 having grating lines 84 oriented completely randomly to each other. The grating lines in FIG. 8(a) fill the shown surface less intensely than the surface of identical geometric size shown in FIG. 8(b). This results in the grating field in FIG. 8(a) exhibiting a less pronounced matte pattern effect than the grating field in FIG. 8(b). Thus, for a viewer, the grating field in FIG. 8(a) appears darker than the grating field in FIG. 8(b).

If, as in this specific embodiment, it is possible to produce a connection between the brightness of the surface covered with electromagnetic radiation-influencing gratings and suitable geometric parameters, then even the relative brightness of the appropriate surface areas can be specifically varied. The grating pattern in FIG. 8(a) has, for example, a quantifiably larger average geometric mesh pitch than the grating pattern in FIG. 8(b).

In addition to the variation illustrated in FIGS. 3 to 8 in the parameters orientation, curvature and spacing of the grating lines, the profile of the grating lines can also be varied. For example, the line profile can be changed multiply and continuously across the surface of the grating field from a sinusoidal form to a crenellated form and back to the sinusoidal form. Also the height and/or symmetry of the line profile can be varied. In addition to the continuous change, the form of the line profile can also vary randomly and discontinuously between adjacent grating lines.

It is further understood that not just one of the characteristic parameters can be varied across the surface of the grating field, but also multiple parameters simultaneously. For example, the grating lines in a grating field can vary at once in the parameters spacing, orientation and profile.

It is possible to produce all of the described electromagnetic radiation-influencing grating patterns by means of electron beam lithography. This technique facilitates the production of grating images in which, in extreme cases, each individual line of a line grating can be unambiguously defined by said characteristic parameters.

Figure 9A:
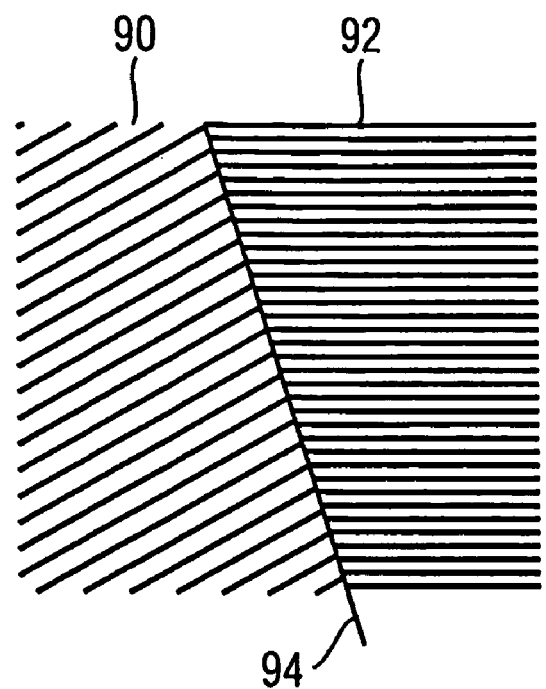
Figure 9B:
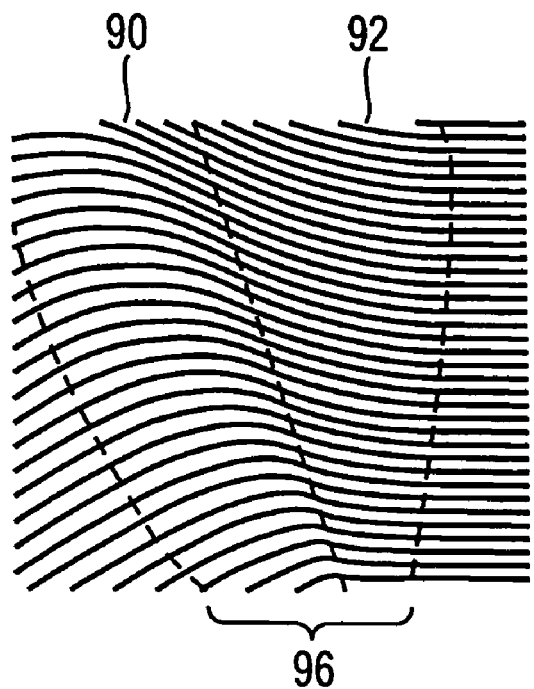

While FIGS. 3 to 8 illustrate the large-area coverage of entire grating fields with an electromagnetic radiation-influencing grating pattern, FIG. 9 shows a detailed top view of the transition between two adjoining grating fields 90 and 92. Here, FIG. 9(a) shows the typical progression of the grating lines at the borderline 94 of two grating fields as it results when manufacturing the grating image by means of optical direct exposure or dot matrix systems.

The electromagnetic radiation-influencing grating pattern of the first grating field 90 will generally differ in one or more of the characteristic parameters from the electromagnetic radiation-influencing grating pattern of the second grating field 92. In the example in FIG. 9(a), the electromagnetic radiation-influencing grating pattern of the first grating field 90 differs significantly from the electromagnetic radiation-influencing grating pattern of the second grating field 92 in the parameters spacing and orientation. Thus, discontinuities occur along the borderline 94 that disrupt the optical appearance of the grating image when viewed.

To remedy this, the present invention provides, between the first grating field 90 and the second grating field 92, a transition area 96 in which the characteristic parameters of the grating lines of the first grating field continuously change into the characteristic parameters of the grating lines of the second grating field. Such soft transitions can be realized relatively easily with electron beam lithography without interrupting the grating lines.

With reference to the length scale on which the transition occurs, there are two options for the designer. If the transition between the electromagnetic radiation-influencing grating pattern of the two grating fields is allowed to occur on a length scale of about 100 µm or less, then the viewer cannot perceive the transition area with the naked eye. Thus, only the interfering optical artifacts at the borderline of the two grating fields are removed.

On the other hand, if the transition is allowed to occur on a length scale of more than 100 µm, then the transition area can be perceived by the viewer. This can be exploited to produce novel optical effects in the transition of two grating fields.

Figure 10:
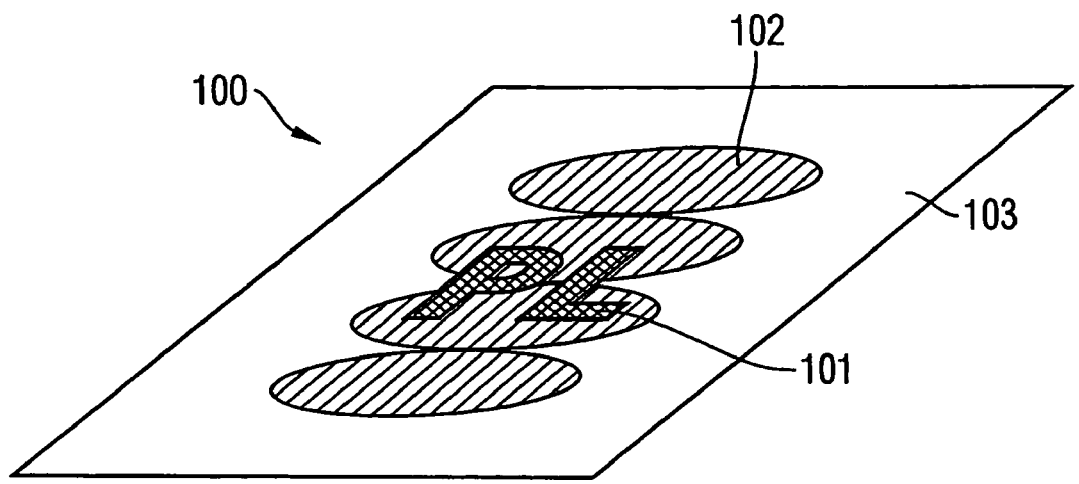

FIG. 10 shows a security element 100 having a grating image 101 according to the present invention and a partially applied thin-film structure 102. In the present embodiment, a paint was applied to a transparent foil material 103, in which the lettering "PL" was introduced as a grating image. Over this was vapor deposited, in the form of circles, a thin-film structure that in this case consists of an absorber layer, a dielectric layer and a further absorber layer.

Figure 11:
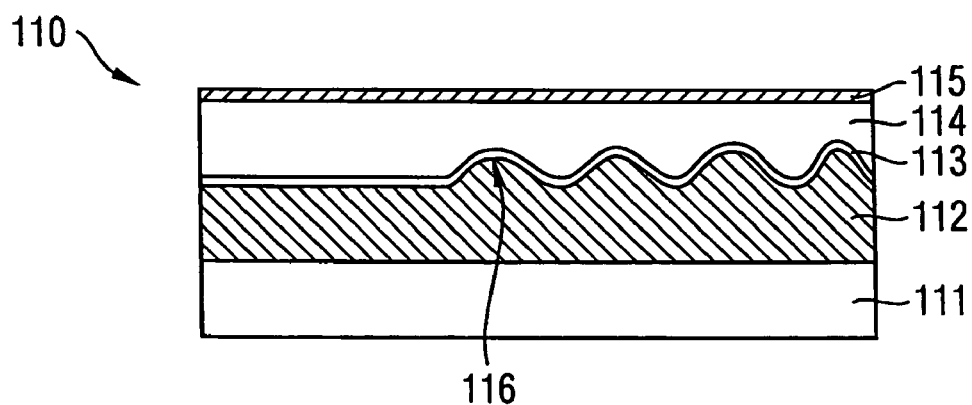

FIG. 11 shows a further security element 110 in which a paint layer 112 was applied to a substrate foil 111. A grating image 116 was partially introduced into the paint layer. Above this is located an absorber layer 113 and a high-index, dielectric layer 114. A reflecting layer 115 was applied above this dielectric layer. The layers of the thin-film structure were vacuum vapor deposited.

The invention claimed is:

1. A grating image having one or more grating fields, each of which includes an electromagnetic-radiation-influencing grating pattern comprising a plurality of grating lines, the grating lines being characterized by the parameters orientation, curvature, spacing and profile, wherein in the grating image, a grating field that is separately perceptible with the naked eye includes an electromagnetic radiation-influencing grating pattern having grating lines for which at least one of the characteristic parameters orientation, curvature, spacing and profile varies across the surface of the grating field,
    wherein the grating field forms a matte pattern,
    wherein the varying characteristic parameter(s) exhibit a random variation across the surface of the grating field, and
    wherein said grating field displays no diffractive effects when viewed.

2. The grating image according to claim 1, wherein said grating field includes an electromagnetic radiation-influencing grating pattern comprising uninterrupted grating lines.

3. The grating image according to claim 1 wherein said grating field includes at least one further electromagnetic radiation-influencing grating pattern having grating lines for which at least one of the characteristic parameters orientation, curvature, spacing and profile varies across the surface of the grating field.

4. The grating image according to claim 3, wherein the electromagnetic radiation-influencing grating patterns exhibit a variation in those same parameters.

5. The grating image according to claim 3, wherein the grating lines of the electromagnetic radiation-influencing grating pattern differ from one another by a non-varying characteristic parameter.

6. The grating image according to claim 5, wherein the non-varying characteristic parameter is the orientation of the grating lines.

7. The grating image according to claim 1 wherein the grating fields exhibit different optical brightness.

8. The grating image according claim 1, wherein the grating lines are electron beam lithographically produced.

9. The grating image according to claim 1, wherein the grating lines exhibit a line profile depth between about 100 nm and about 400 nm.

10. The grating image according to claim 1, wherein the grating image is coated with a reflecting or high-index material.

11. The grating image according to claim 1, wherein the grating image includes a machine-readable identifier that is not visible with the naked eye.

12. The grating image according to claim 1, wherein the grating image is combined with a color-shifting thin-film structure.

13. A method of manufacturing a grating image, which comprises forming in a substrate one or more grating fields, providing each of the grating fields with an electromagnetic radiation-influencing grating pattern filling the grating fields and comprising a plurality of grating lines, the grating lines being characterized by the parameters orientation, curvature, spacing and profile, and in the grating image, a grating field that is separately perceptible with the naked eye is filled with an electromagnetic radiation-influencing grating pattern having grating lines for which at least one of the characteristic parameters orientation, curvature, spacing and profile is varied across the surface of the grating field, wherein the grating field forms a matte pattern, wherein the varying characteristic parameter(s) exhibit a random variation across the surface of the grating field, and wherein said grating field displays no diffractive effects when viewed.

14. A security element having a grating image according to at least one of claim 1.

15. The security element according to claim 14, wherein the security element is a security thread, a label or a transfer element.

16. A security paper having a security element according to claim 14.

17. A data carrier having a grating image according to claim 1.

18. The data carrier according to claim 17, wherein the data carrier is a banknote, a value document, a passport, an identification card or a certificate.

19. The grating image according to claim 1, wherein the varying characteristic parameter(s) exhibit a random and discontinuous variation across the surface of the grating field.

* * * * *